(12) United States Patent (10) Patent No.: US 7,571,058 B2
Sealing et al. (45) Date of Patent: Aug. 4, 2009

(54) SYSTEM TO MONITOR THE HEALTH OF A STRUCTURE, PROGRAM PRODUCT AND RELATED METHODS

(75) Inventors: Charles Scott Sealing, Clifton Park, NY (US); Ertugrul Berkcan, Clifton Park, NY (US); Emad Andarawis Andarawis, Ballston Lake, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/430,410

(22) Filed: May 9, 2006

(65) Prior Publication Data

US 2007/0265790 A1 Nov. 15, 2007

(51) Int. Cl.
*G01B 3/44* (2006.01)
*G01B 3/52* (2006.01)

(52) U.S. Cl. ....................................... 702/34
(58) Field of Classification Search ............. 702/33–35, 702/36; 73/583, 802
See application file for complete search history.

(56) References Cited

U.S. PATENT DOCUMENTS

| | | | | |
|---|---|---|---|---|
| 5,128,684 A | * | 7/1992 | Brown | 342/189 |
| 5,816,530 A | * | 10/1998 | Grube | 244/1 R |
| 6,006,163 A | * | 12/1999 | Lichtenwalner et al. | 702/36 |
| 6,026,348 A | | 2/2000 | Hala | |
| 6,399,939 B1 | | 6/2002 | Sundarensan et al. | |
| 7,080,555 B2 | * | 7/2006 | Austin et al. | 73/587 |
| 7,271,747 B2 | * | 9/2007 | Baraniuk et al. | 341/87 |
| 7,276,703 B2 | * | 10/2007 | Berkcan et al. | 250/358.1 |
| 7,343,265 B2 | * | 3/2008 | Andarawis et al. | 702/188 |
| 2003/0191564 A1 | | 10/2003 | Haugse et al. | |
| 2006/0071774 A1 | * | 4/2006 | Brown et al. | 340/522 |
| 2006/0106550 A1 | * | 5/2006 | Morin et al. | 702/34 |
| 2007/0114422 A1 | * | 5/2007 | Berkcan et al. | 250/358.1 |
| 2007/0118301 A1 | * | 5/2007 | Andarawis et al. | 702/33 |
| 2007/0118335 A1 | * | 5/2007 | Andarawis et al. | 702/188 |

* cited by examiner

*Primary Examiner*—Michael P Nghiem
(74) *Attorney, Agent, or Firm*—Bracewell & Giuliani LLP

(57) ABSTRACT

A system to monitor the health of the structure, program product, and associated methods are provided. The system can include multiple health monitoring sensor nodes positioned to monitor parameters of a portion of the body of the structure. Sensor elements of the sensor nodes are spatially positioned along the body of structure at related or complementary locations to form a special correlative relationship between sensor nodes. The system can also include a data collector having a transceiver positioned to gather sensed parameter data from each of the sensor nodes, and a central computer including in memory, parameter process program product adapted to analyze the sensed parameter data, correlate the sensed parameter data to infer a state of health of the structure responsive to the correlation, and to detect or otherwise determine a type, severity, and/or location of damage to or incipient failure of the structure.

14 Claims, 10 Drawing Sheets

Beam Displacement/Strain @25% t

SYSTEM TO MONITOR THE HEALTH OF A STRUCTURE, PROGRAM PRODUCT AND RELATED METHODS

BACKGROUND OF THE INVENTION

1. Field of the Invention

The present invention relates generally to multi-node sensor systems. More specifically, the present invention relates to a system, program product, and related methods to monitor the health of structural components.

2. Description of the Related Art

Various types of platforms such as, for example, aircraft structural components, aircraft skins, or other related components when in operation are subjected to various environmental conditions such as stress and strain, exposure to temperature extremes, and/or significant vibration energy. Due to the various environmental conditions such components can suffer material degradation over time. Structural health monitoring helps promote realization of the full potential of such components.

Traditionally, structural monitoring has relied upon using ultrasound techniques on the structure prior to installation (not in situ). More recently, remotely positioned sensors units or nodes have been installed adjacent to such structures/components to monitor various parameters such as, for example, strain levels, stress, temperature, pressure, or vibration level to help manage physical inspection schedules, maintenance schedules to help predict material failure and to generally monitor the "health" of such components.

Such nodes have been provided a dedicated power supply through conductors, e.g., wires, connected to the aircraft/vehicle electrical system or through chemical batteries. Similarly, the nodes have been provided communication through conductors, e.g., wires or optical fiber. Such wiring can undesirably result in increased weight and complexity of the component being monitored and/or of the associated structure or component and are subject to damage or breakage requiring extensive repair costs and down time.

Other structural health monitoring systems include self-powered sensors/nodes attached to or embedded within the components to be monitored that can reduce dependence on batteries or any other external power source and can negate the need for a "wired" communication pathways. Such sensors can be relatively small in size and can utilize energy obtained or otherwise transmitted through the component or structure being monitored as both a power and data source.

Data capturing systems, such as that employing radiofrequency identification, can also be used in health monitoring. Such systems can include both active and passive wireless communication schemes. The active wireless sensors/nodes can provide a continuous or intermittent stream of sampled raw data indicating parameters of the component or structure being monitored. The data is typically collected by a central collector or by a series of intermediate collectors which provide such data to a central collector. The passive wireless sensors can also collect a continuous or intermittent stream of sampled raw data indicating parameters of the component or structure being monitored. The passive sensors, however, do not actively transmit such data, but instead receive energy from an interrogation unit, which provides power to extract the sensor data. The passive wireless sensors are most often utilized in applications where ultra low power communication is desired. In such passive systems, an interrogator can transmit a signal to each passive wireless sensor to power the sensor and to transmit a request for data.

Conventional systems do not have provisions for correlating the outputs of a multiplicity of health monitoring sensor nodes in both space and time to infer a state of health of a structure that cannot be otherwise obtained using the non-correlated output of the sensor nodes. For example, there exists systems having sensors that can determine the existence and possibly the location of a bird strike, for example, due to an associated acoustic emission, but cannot correlate sensor data to determine or infer the damage caused by the bird strike or other damage such as delamination or material fatigue. Further, even detection of the location of damage using acoustic emissions can be difficult if not impossible where the damage is equally spaced from any surrounding sensors. There also exists systems which can detect acceleration, stress, strain, or pressure and therefore can determine if a corresponding acceleration, stress, strain, or pressure limit has been exceeded. Such systems, however, primarily derive their data from a single sensor, and thus, cannot correlate such data to infer damage that will eventually result in exceeding such a limit prior to actually exceeding such limits.

In a multi-sensor node wireless monitoring application, it is often necessary to relate events seen by one sensor node to events seen by another. This requires complicated and power hungry clock distribution or synchronization techniques for timing and complicated algorithms for relating the data to the structure. Moreover time synchronization typically can require an explicit clock distribution, e.g., real-time clock, or direct wiring. To alleviate such problems, some systems have eliminated any data correlation, resulting in the data from all the different nodes being processed independently without any knowledge of what the rest of the system is experiencing. In such implementation, typically the system uses point-to-point communication with no data correlation between the nodes. The Applicants have recognized that reduction of system functionality and flexibility generally results from such techniques.

Recognized by the Applicants, therefore, is the need to provide a wireless multi-sensor node structural health monitoring system that can correlate structural health data from multiple sensor nodes both in time and in space, allowing a more complete view of the health of the structure. Also recognized is the need to provide multi-sensor node health monitoring system that provides an ability to detect damage and identify a failure location without the need to remove external structural components, without the need for a real-time clock, and without the need for complicated data synchronization algorithms.

SUMMARY OF THE INVENTION

In view of the foregoing, embodiments of the present invention advantageously provide a structural health monitoring system that can correlate structural health data from multiple sensor nodes both in time and in space. Embodiments of the health monitoring system include multiple sensor nodes having sensor element spatially placed in related or complementary positions to provide correlated or correlatable data used to identify failures and impending conditions within the structure. Embodiments of the present invention also advantageously provide a structural health monitoring system that includes a multiple sensor nodes that are low power and that have less complexity than conventional multiple node systems.

More specifically, in an embodiment of the present invention, a system to monitor the structural health of the structure is provided. The system can include a structure to be monitored having a body and can include a plurality of separate and spaced apart health monitoring sensor nodes each connected to or embedded within the body of the structure to monitor data related to parameters of a portion of the body of the structure. Each node health monitoring sensor node includes a sensor element positioned within or external to the main portion of the sensor and positionable to sense parameters of a respective portion of the body of the structure to define sensed parameters. Each sensor node also includes a processor coupled to the sensor element to receive sensed parameters and memory coupled to the processor to store data and operating instructions therein. At least one of the plurality of health monitoring sensor nodes is spatially positioned along the body of structure at a related or a complementary location to that of at least one other of the plurality of health monitoring sensor nodes to form a special correlative relationship therebetween. The system also includes a data collector having a transceiver positioned to gather or request sensed parameter data from each of the plurality of health monitoring sensor nodes and/or to receive requested sensed parameter data therefrom, and to transmit a periodic time synchronization message to each of the plurality of health monitoring sensor nodes. The system also includes a central computer in communication with the data collector and having a processor and memory coupled to the processor to store requested data and operating instructions therein.

According to an embodiment of the present invention, the system further includes parameter processing program product stored in part in the memory of central computer and including instructions that when executed by the central computer processor perform the operations of collectively analyzing the sensed parameter data from each of the plurality of health monitoring sensor nodes, correlating the sensed parameter data from each of the plurality of health monitoring sensor nodes in both space and time, inferring a state of health of the structure responsive to the correlation, and detecting or otherwise determining a type, severity, and/or location of damage to the structure or incipient failure thereof responsive to the inference.

According to another embodiment of the present invention, the system further includes parameter processing program product stored in part in the memory of one of the plurality of health monitoring sensor nodes and including instructions that when executed by the respective processor performs the operations of gathering sensed parameters from at least one other of the plurality of health monitoring sensor nodes, collectively analyzing the sensed parameters from the one of the plurality of health monitoring sensor nodes and the at least one other of the plurality of health monitoring sensor nodes, correlating the sensed parameter data in both space and time, inferring a state of health of the structure responsive to the correlation, and detecting or otherwise determining a type, severity, and/or location of damage to the structure or incipient failure thereof responsive to the inference.

Embodiments of the present invention also include methods of monitoring the structural health of the structure. A method, for example, can include positioning a plurality of health monitoring sensor nodes at spatially related or complementary positions along a body of a structure to form a special correlative relationship, sensing parameters of a portion of the body of the structure by each of a plurality of health monitoring sensor nodes, gathering sensed parameter data from each of the plurality of health monitoring sensor nodes, and correlating the sensed parameter data from each of the plurality of health monitoring sensor nodes in both space and time to infer a state of health of the structure to thereby detect or otherwise determine a type, severity, and/or location of damage to the structure or to detect or otherwise determine incipient failure thereof. The method can also include employing data acquisition synchronization between each of the plurality of health monitoring sensor nodes to provide an enhanced view of the health of the structure, and employing a network time synchronization process to correct a time sampling phase error in each of the plurality of health monitoring sensor nodes to help ensure accuracy in the data acquisition synchronization.

Advantageously, embodiments of the system are in situ, i.e., remaining with the structure during its life, so that the system can detect the onset of a failure which would be missed by non-in situ systems. Also advantageously, according to an embodiment of the system, detection of damage or a failure is not event triggered, thus allowing detection and/or location of damage which occurred when the system was off-line. Further, advantageously due to the synchronization process, according to an embodiment of the present invention, no real-time clock is required by the sensor nodes.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Systems such as, for example, multi-node health monitoring systems can be provided to monitor the health of various types of structures. Such structural health monitoring systems can include multiple sensor nodes connected to or embedded within a structure to perform their associated function. Such systems can detect acceleration, stress, strain, or pressure and therefore can determine if a corresponding acceleration, stress, strain, or pressure limit has been exceeded. Other such systems can locate an approximate position of a damage event during such event. Such systems, however, primarily derive their data from a single sensor, and thus, cannot correlate such data to infer damage that will eventually result in exceeding a predetermined limitation prior to actually exceeding such limitation. Thus, advantageously, as illustrated in FIGS. 1-21, embodiments of the present invention provide a structural health monitoring system, program product, and methods of monitoring the structural health of a structure which can provide a correlative analysis of data from more than one location along a structure transferable to a receiving location by a typical conventional wireless sensor and network based system, and which is significantly more valuable than that which can be obtained by any combination of single point analysis.

Figure 1:
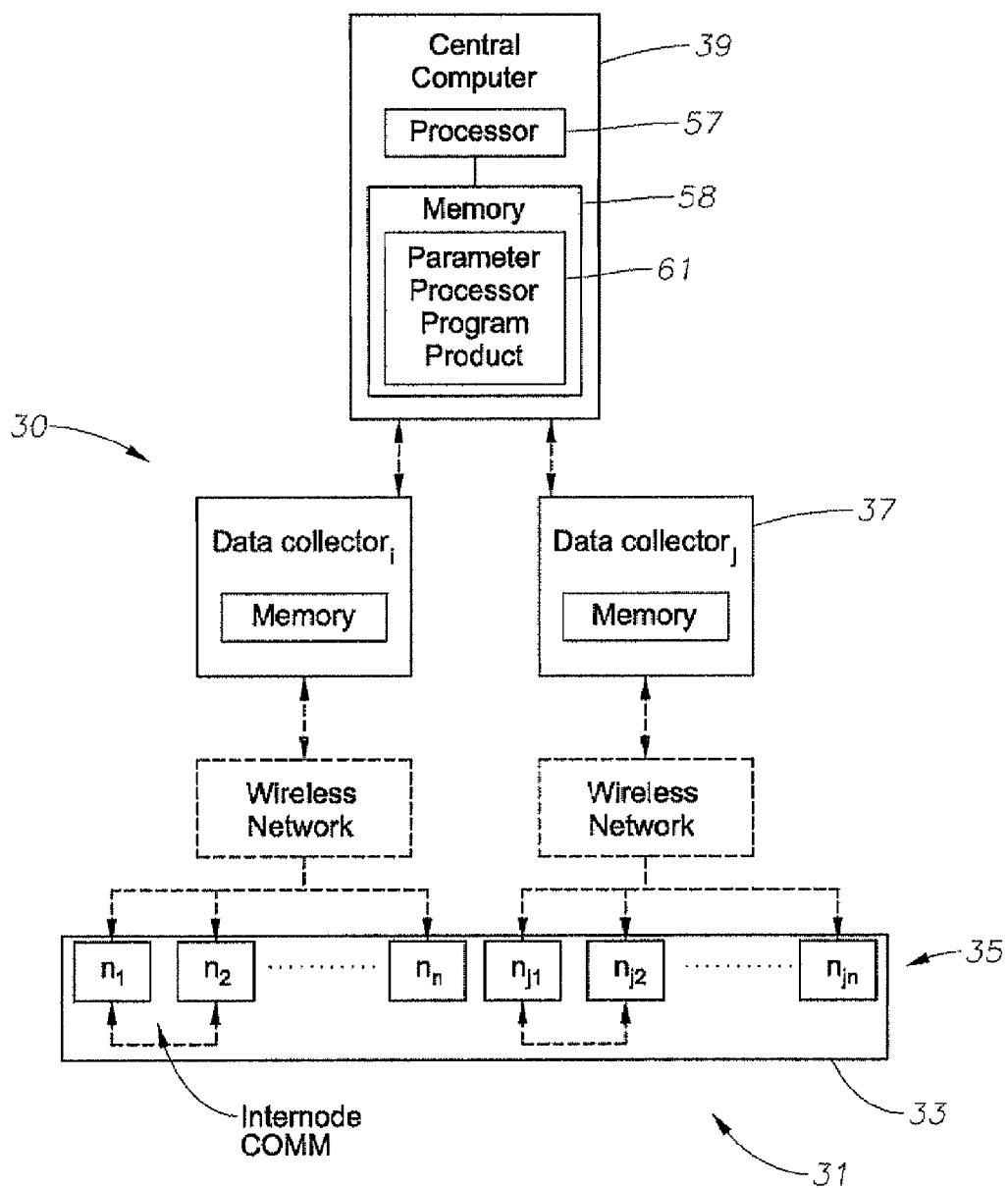
FIG. 1 is a schematic diagram of a general system architecture of a system to monitor the health of a structure according to an embodiment of the present invention.

As perhaps best shown in FIG. 1, embodiments of the present invention provide a structural health monitoring system such as, for example, structural health monitoring system 30. The system 30 can include a structure to be monitored having a body 33. The structure 31 can be, for example, the leading-edge, a joint, or the skin of an aircraft wing, structural member of a bridge, or other structural members known to those skilled in the art. The system 30 also includes a plurality of health monitoring sensor nodes 35 to monitor the health of the structure 31. The health monitoring sensor nodes 35 are spatially positionable along the body 33 of the structure 31 at related or a complementary locations to that of at least one other of the plurality of health monitoring sensor nodes 35 to form a special correlative relationship therebetween. The system 30 also includes one or more data collectors or interrogators 37 either positioned or positionable to transmit data to and to receive data from each of the health monitoring sensor nodes 35, and a central processor or computer 39 to compile the collected data to provide for both monitoring and managing the health of the structure 31.

Figure 2:
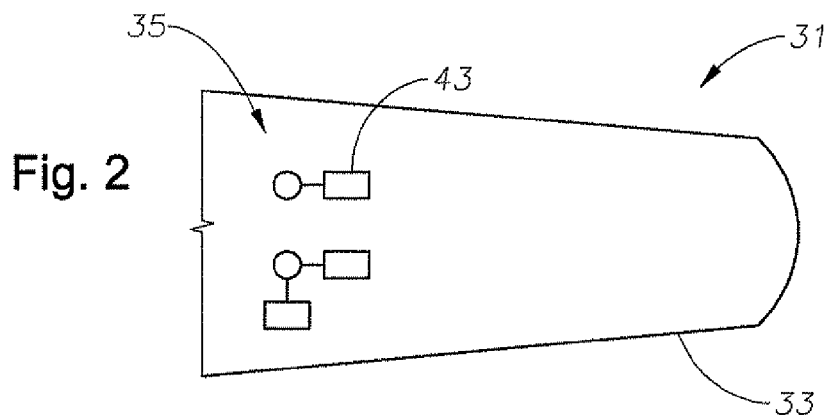
FIG. 2 is a partial environmental view of a system to monitor the health of a structure according to an embodiment of the present invention.
Figure 3:
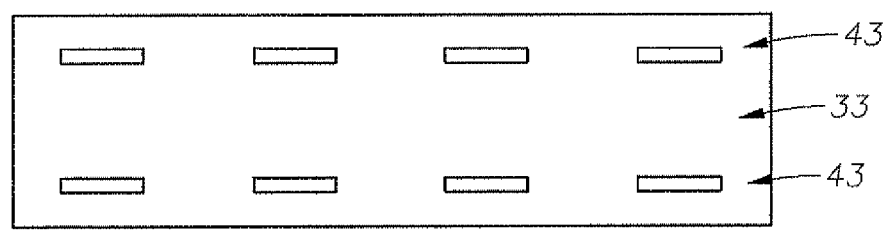
FIG. 3 is a schematic diagram of a structure to be monitored having embedded sensor elements according to an embodiment of the present invention.
Figure 4:
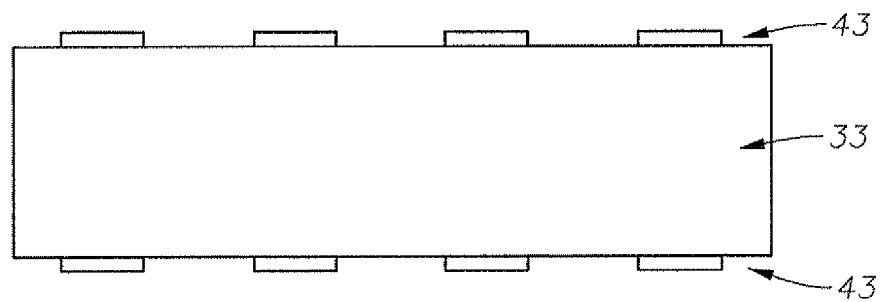
FIG. 4 is a schematic diagram of a structure to be monitored having surface sensor elements according to an embodiment of the present invention.

As shown in FIGS. 2-4, the system 30 includes a plurality of health monitoring sensor nodes 35 connected to or embedded within the body 33 of the structure 31, e.g., aircraft skin, or connected to either an outer or inner surface of the body 33 of the structure 31, to monitor or sense data related to various parameters of interest. Such parameters of interest can include, for example, temperature, pressure, strain which is preferably temperature compensated, and acceleration including vibration levels, just to name a few. As many as twenty to thirty or more health monitoring sensor nodes 35 per square foot can be positioned throughout strategic locations along the aircraft or other structure 31. Each health monitoring sensor node 35 can include a processor 41 (see FIGS. 5-6) in communication with one or more sensor elements 43 (see, e.g., FIGS. 3-6) connected to the processor 41 either positioned within the sensor node 35 or tethered by, for example, an electrical or a fiber-optic conductor.

According to an embodiment of the present invention, each sensor element 43 and/or sensor node 35, through its respective sensor element or elements 43, can be spatially positioned at a related or complementary location along the body 33 of the structure to provide for development of a special correlative relationship between the sensor elements 43 and/or sensor nodes 35. A spatial aspect of the special correlative relationship can be formed, for example, by positioning the sensor elements 43 and/or sensor nodes 35 on opposite sides of an axis of symmetry 45 (see FIGS. 7-8) of the body 33 of the structure 31, in a parallel plane above or below the axis of symmetry 45 (see FIGS. 3-4), and in multiple planes forming layers extending away from the axis of symmetry (not shown). Note, formation of the special correlative relationship will be described in more detail later. If the structure 31, for example, is the body of an aircraft wing, the spatial portion of special correlative relationship can, for example, extend along the length of the wing between the root and the tip, between the axis of symmetry 45 and the upper wing surface, between the axis of symmetry 45 and the lower wing surface, and across the axis of symmetry 45 of the wing between the upper and lower (opposite) sides.

Figure 5:
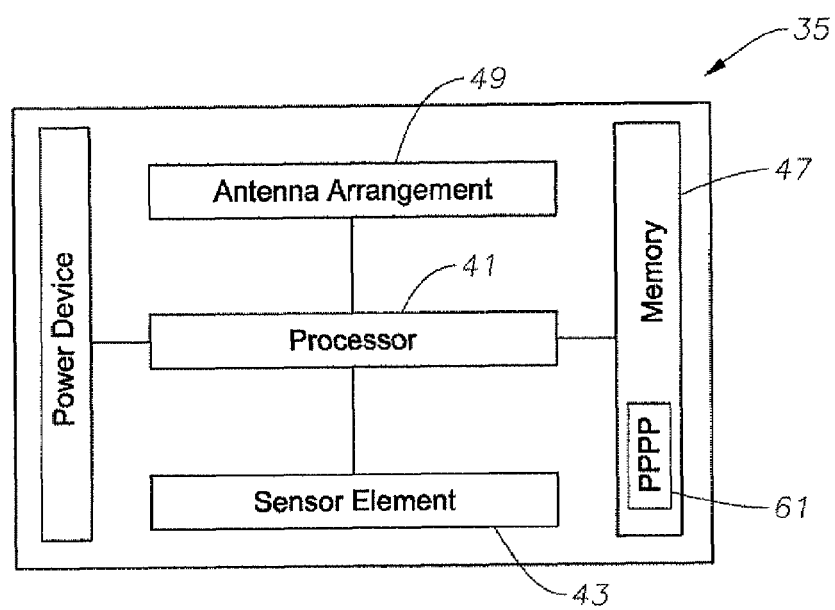
FIG. 5 is a schematic diagram of a health monitoring sensor node configured to have an internal sensor element according to an embodiment of the present invention.

As shown in FIG. 5, there are embodiments where each sensor node 35 has its own sensor element 43 positioned therein. At least one such application would be where sensor elements 43 are being distributed on or within a carbon fiber structure during initial manufacture or during repairs to the structure. In other embodiments, such as that shown in FIG. 6, each sensor node 35 is connected to multiple sensor elements 43. At least one such application of the present invention would be the retrofitting of aging metallic structure such as, for example, an aircraft airframe already in operation, having areas of interest not readily susceptible to receiving the sensor nodes 35, themselves. In such application, providing a sensor node 35 having multiple "legs" tethering multiple sensor elements 43, may be preferred.

Each sensor element 43 can be in the form of a strain gage, temperature sensor, pressure sensor, accelerometer, acoustic receiver, or other form of sensor known to those skilled in the art, and each health monitoring sensor node 35 can support one or more sensor elements 43 having either the same form or each having a separate form. For example, in order to provide temperature compensated strain, one sensor element 43 can be a piezoelectric strain gage, while the other can be a temperature sensor.

According to an embodiment of the presentation, the two or more associated sensor elements 43 can be connected across opposite sides of the axis of symmetry 45. According to an embodiment of the present invention, such sensor elements 43 need not necessarily be connected to or a part of separate sensor nodes 35, but can be connected to the same sensor node 35. For example, where the structure 31 is an aircraft wing having an internal cavity, the first sensor element 43 can be connected to an internal portion of the upper surface of the wing and a second sensor element 43 can be connected to an internal portion of the lower surface of the wing with both the first and the second sensor elements 43 connected to the same sensor node 35.

The sensor elements 43 are generally sized as necessary to provide reliable sensed parameters to the sensor node 43. The following will refer to strain sensor elements for illustrative purposes only. Strain gage sensor elements are size according to whether or not a single sensor element 43 is to be used with or in a single sensor node 35 or if multiple sensor elements 43 are to be used with a single sensor node 35, and in the multi-sensor element 43 configuration, according to the size of the area of the body 33 of the structure 31 to be covered and the power available from the sensor node 35. Also, where the parameter of interest is correspondingly strain as in this illustration, the surface area of the strain gauge is governed by the kind of surface area of body 33 selected to average/sense strain. As is known to those skilled in the art, the larger the strain gage, the larger the area of the body 33 the sensed strain will be averaged over. According to a preferred configuration, the sensor element 43, when in the form of a strain gage, should have surface dimensions preferably in a range of about 0.5 cm to 2.5 cm, and more preferably be sized to be about 1.5 cm by 2.5 cm. According to this configuration, the surface dimensions of the strain gage sensor element 43 should also about at least 5 mm by 5 mm, otherwise there is a tendency to report the strain over too localized of an area of the body 33.

Figure 6:
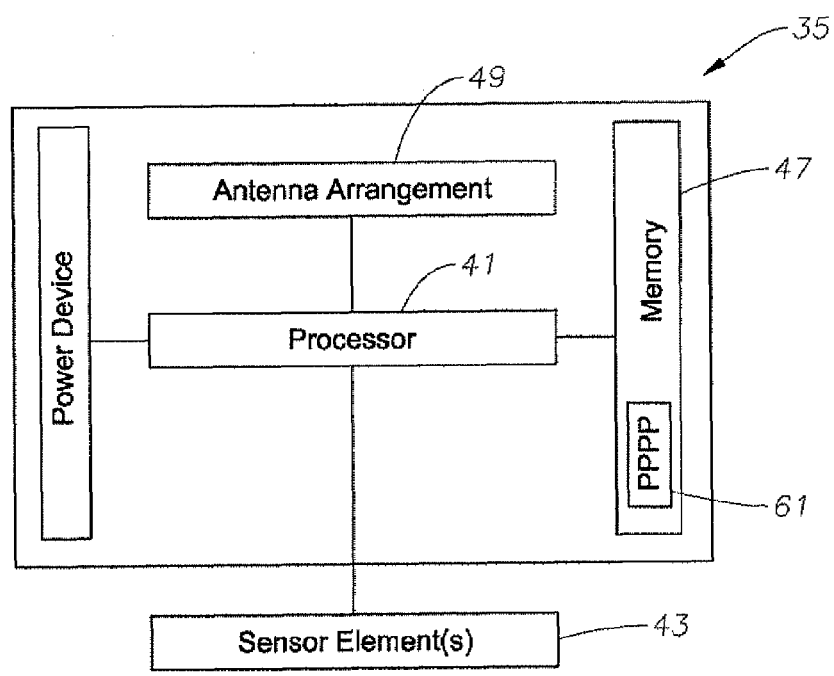
FIG. 6 is a schematic diagram of a health monitoring sensor node configured to have an external sensor element according to an embodiment of the present invention.

As shown in FIGS. 5-6, each health monitoring sensor node 35 can also include memory 47 coupled to the processor 41 to store operating instructions and to store data related to the parameters of interest. Such data can be in the form of either raw sensor data or reduced form of the data such as, for example, a data structure summarizing the raw sensor data or summarizing information analyzed from the raw data. If the data from the sensor elements 43 is supplied in an analog form, a sensor interface (not shown) located within or external to the processor 41 can be used to prepare the sensor signal/data for use by the processor 41. For example, the sensor interface can include a signal conditioner, amplifier, automatic gain control, analog to digital converter, and/or other active elements as known to those skilled in the art. Each health monitoring sensor node 35 can also include an antenna arrangement 49 coupled to the processor 41 to receive data signals from a pass signals to a data collector and/or one or more of the health monitoring sensor nodes 35.

The system 30 can include one or more data collectors or interrogators 37 in the form of a health monitoring sensor node interrogator, for example, having a transceiver positioned to request sensed parameter data from each of a subset of the health monitoring sensor nodes 35 and to receive requested sensed parameter data therefrom. The transceiver of each data collector or interrogator 37 can also transmit or otherwise relay a periodic time synchronization message to each associated health monitoring sensor nodes 35 to allow update of a respective "software clock." Note, according to an embodiment of the system 30, where the system 30 includes a plurality of data collectors or interrogators 37, at least one of the data collectors or interrogators 37 can be one of the health monitoring sensor nodes 35. The system 30 can also include a central computer 39 in communication with each data collector or interrogator 37, also having a processor 57 and memory 58 coupled to the processor 57 to store requested data and operating instructions therein to compile or collect data to thereby provide for monitoring and managing the health of the structure 31. According to an embodiment of the present invention, at least a portion of the parameter processing program product 61 is stored in the memory 58 of central computer 39. The parameter processing program product 61 stored in the memory 58 of the central computer 39 can include instructions that when executed by the central computer processor 57 perform the operations of collectively analyzing the sensed parameter data from each of the plurality of health monitoring sensor nodes and spatially correlating the sensed parameter data from each of the plurality of health monitoring sensor nodes to infer a state of health of the structure to thereby provide damage and incipient failure detection.

Each health monitoring sensor node 35 can include a portion of the parameter processing program product 61 stored in memory 47 which includes instructions that when executed by the processor 41 of the health monitoring sensor node 35 can perform the various operations described below. According to an embodiment of the present invention, a portion of the parameter processing program product 61 can also be stored in the memory of each data collector or interrogator 37. Note, the program product 61 can be in the form of microcode, programs, routines, and symbolic languages that provide a specific set for sets of ordered operations that control the functioning of the hardware and direct its operation, as known and understood by those skilled in the art. The program product 61 can be delivered on a single computer readable medium or divided among multiple computer readable media.

According to embodiment of the present invention, the parameter processing program product 61 can include, for example, those instructions to perform the operations of sensing parameters of a portion of a body 33 of a structure 31 by each of a plurality of health monitoring sensor nodes 35. The instructions can also include those to perform the operation of automatically sensing parameter data through the sensor elements 43 in response to an internal counter or timer 63 (see, e.g. FIGS. 20-21) or performing such sensing in response to an externally generated request from the central computer 39, a data collector 37, or another sensor node 35. The instructions can also include those to perform the operations of collectively analyzing the sensed parameter data from each of the plurality of health monitoring sensor nodes 35 by either the central computer 39, a data collector 37, or one or more of the sensor nodes 35, and correlating the sensed parameter data from each of the health monitoring sensor nodes 35 to detect a change in the special correlating relationship, such as, for example, a change in stress or stress distribution among nodes 35, spatially and/or temporally, indicating onset of an incipient failure of the structure and/or actual damage, e.g., crack in or delamination of the structure 31, to thereby detect either damage to or incipient failure of the portion of the body 33 of the structure 31 being monitored. The instructions can also include those to perform the operation of inferring a state of health of the structure 31 in response to detection of the change in stress distribution and detecting or otherwise determining a type, severity, and/or location of damage to the structure 31 or incipient failure thereof in response to the inference.

According to an embodiment of the present invention, such as, for example, where either the power or bandwidth available to communicate is limited for each of a plurality of groups of health monitoring sensor nodes 35, one of the health monitoring sensor nodes 35 can perform the operations of gathering sensed parameters from at least one other of the health monitoring sensor nodes 35, collectively analyzing the sensed parameters from the one of the health monitoring sensor nodes and the at least one other health monitoring sensor node 35, and/or performing the correlating, inferring, and detecting steps, as described above.

The special correlative relationship can be either spatial or temporal but his preferably both spatial and temporal. As stated previously, a spatial aspect of the special correlative relationship can be formed, for example, by positioning the sensor elements 43 and/or sensor nodes 35 on opposite sides of an axis of symmetry 45 of the body 33 of the structure 31, in a parallel plane above or below the axis of symmetry 45 (see FIGS. 3-4), and in multiple planes forming layers (not shown) extending away from the axis of symmetry 45.

With respect to the spatial relationship, according to one embodiment of the system 30, the system 30 can know the relevant locations or spatial relationship of the each of the health monitoring sensor nodes 35 and/or associated sensor elements 43. That is, the relevant positions of the sensor elements 43 are known and the system 30 knows how to correlate the data using the known positions of the sensor elements 43. Such data can be stored, for example, in the memory of the central computer 39 as part of installation or repair of the sensor elements 43/sensor nodes 35 or can be downloaded during a setup process. For example, the body 33 of the structure 31 can be fabricated to have the sensor elements 43 and sensor nodes 35 in predetermined positions throughout the body 33, or can have the positions recorded during installation, reinstallation, or repair, or as part of a post installation mapping of the sensor elements 43 and sensor nodes 35.

According to another embodiment of the system 30, one sensor node 35 for each group of health monitoring sensor nodes 35 knows or can be provided the relative position of the other sensor nodes 35 and/or associated sensor elements 43. Such data can be stored, for example, in the memory 47 of one or more preselected sensor nodes 35 as part of installation or repair of the sensor elements 43 and sensor nodes 35 or can be downloaded during a setup process. Additionally, one sensor node 35 for each group of health monitoring sensor nodes 35 can discover, through a self-discovery methodology, the relative position of one or more of the other sensor nodes 35 and/or associated sensor elements 43. For example, the sensor nodes 35 can be deployed in pairs and can correlate the data between each other. In such embodiment, one master sensor node 35 for each pair receives data from the other slave sensor node 35, performs computations locally, and transmits any change in correlating data to the data collectors 37 or directly to the central computer 39. In such embodiment, the sensor node pairs can each appear to the central computer 39 as a single sensor node 35.

According to another embodiment of the system 30, the system 30 need not know where the sensor elements 43 are, but each of the sensor elements 43 are positioned in a fixed relationship. As perhaps best shown in FIG. 8, using the illustrated levels of strain as an example parameter of interest on a cantilevered beam, e.g., an aircraft wing, by measuring strain at a first sensor element 53 positioned on upper side of the axis of symmetry 45 during a known event defining a known impulse, e.g., engine run up, aircraft taxi, or initial takeoff, the amount of tension detected by the first sensor element 53 can be used to determine the approximate location of the first sensor element 53 with respect to the axis of symmetry 45. Such known impulses can provide a distinct signature which can be used to establish or determine the special correlative relationship between two or more nodes with respect to each other so that the sensor nodes 35 provide not only, e.g., strain, but relationships of strain, thus making the actual value or scale value less important.

Similarly, by measuring strain, for example, at a second sensor element 55 positioned on the opposite/lower side of the axis of symmetry 45 during the known impulse, the amount of compression detected by the second sensor element 55 can be used to determine the approximate location of the second sensor element 55 with respect to the axis of symmetry 45. Even if a pair of sensor elements 43 are on the same side of the axis of symmetry 45, by determining the relative amount of strain, a relative planner distance between sensor elements 43 can be readily determined. That is, as the sensor elements 43 get closer to or further away from the axis of symmetry 45, the relationship should be either increasing or decreasing depending on whether the sensor element position is closer to or further away from that axis of symmetry 45. Additionally, by detecting whether the sensor elements 53, 55, are in tension or compression during the known impulse, the system 30 can readily determine that the sensor elements 53, 55 and/or associated sensor nodes 35 are on opposite sides of the axis of symmetry 45, so that the system 30 need not know the exact position of the sensor elements 43, but rather just that they are spatially correlated.

Figure 7:
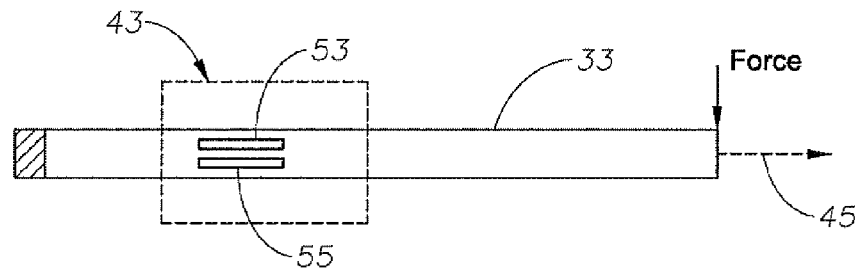
FIG. 7 is a schematic diagram of a cantilevered beam including a sensor elements according to an embodiment of the present invention.
Figure 8:
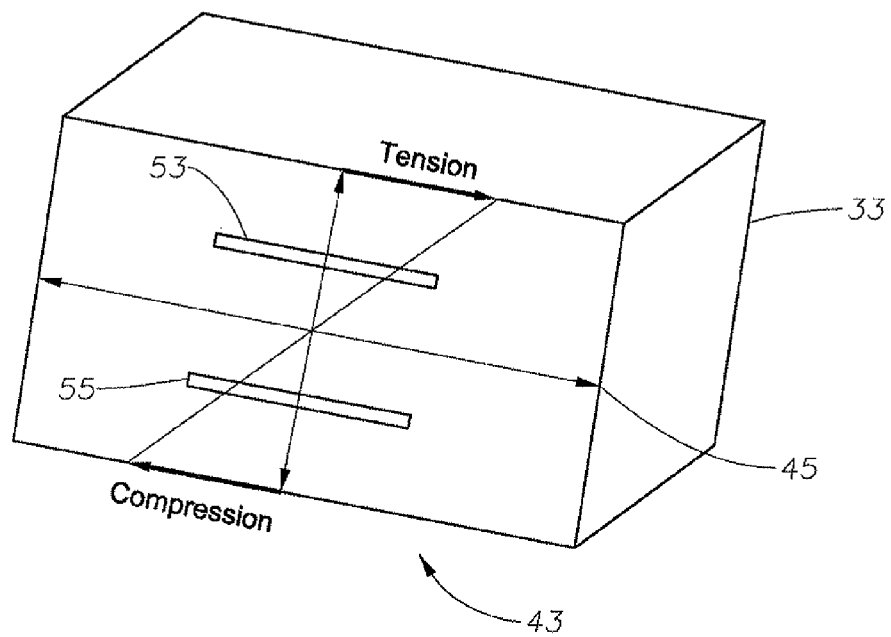
FIG. 8 is a schematic diagram of an enlarged portion of the cantilevered beam shown in FIG. 7 according to an embodiment of the present invention.
Figure 9:
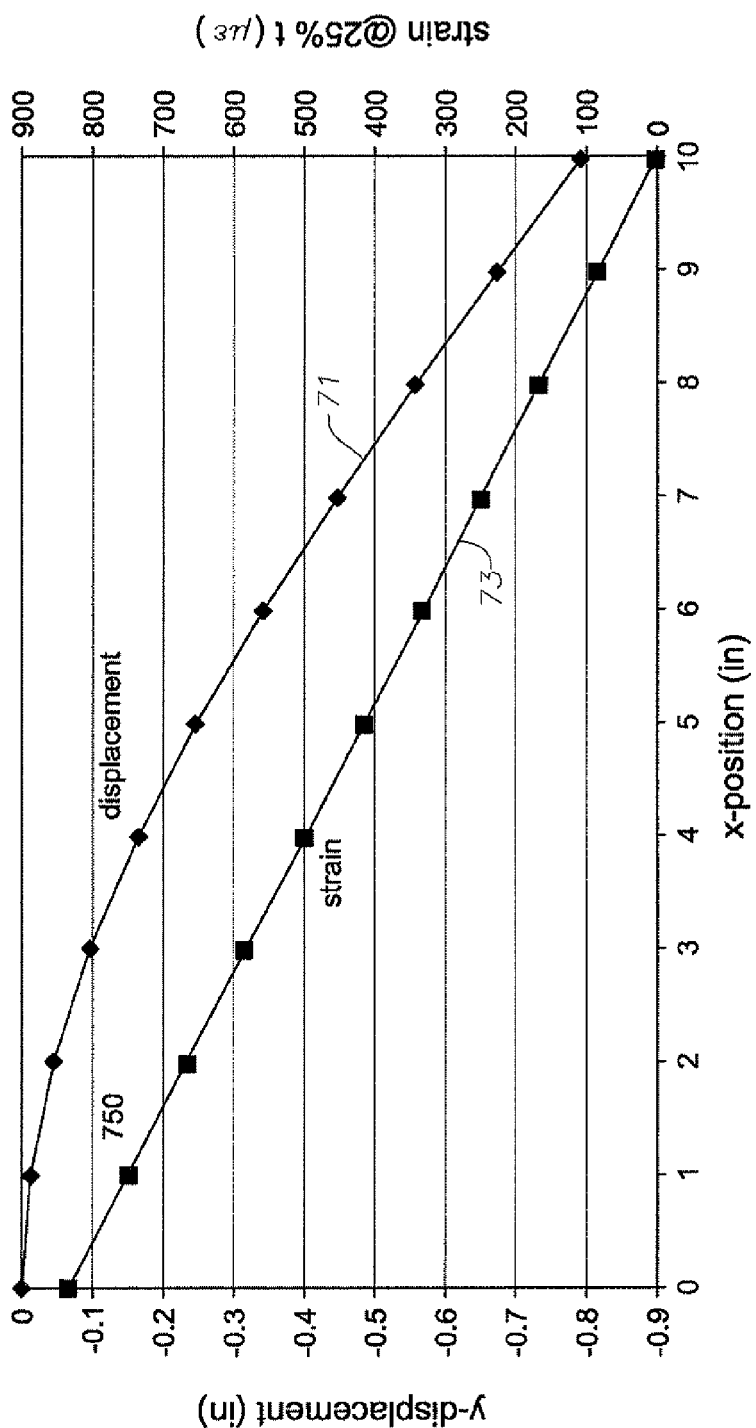
FIG. 9 is a graphical plot of displacement and strain on the cantilevered beam shown in FIG. 7 according to an embodiment of the present invention.
Figure 10:
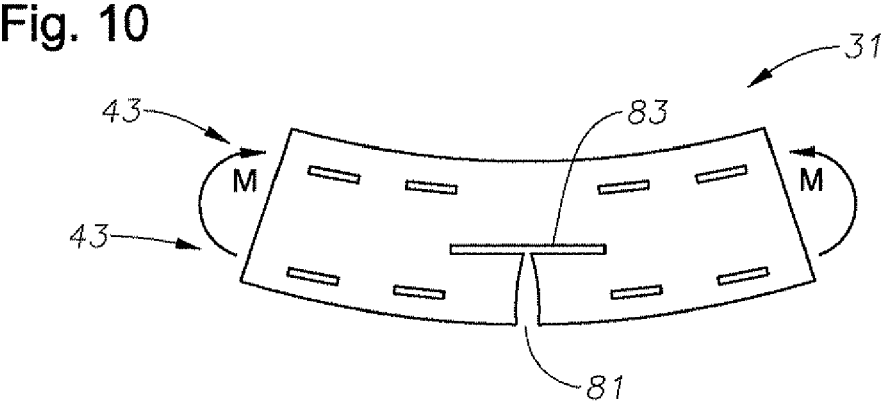
FIG. 10 is a schematic diagram of a structure to be monitored having spatially correlated embedded sensor elements subjected to a bending force and experiencing both a crack and delamination according to an embodiment of the present invention.

As perhaps best shown in FIGS. 7 and 9, in-plane spatial separation describing the special correlative relationship can be determined using such known impulses. For example, as shown in FIG. 9, illustrated is a displacement curve 71 indicating displacement of the free end of a cantilevered beam of FIG. 7 representing the structure 31 and a strain distribution curve 73 indicating a strain distribution along a plane centered upon the tension (upper) portion of the cantilevered beam. As is illustrated, the farther away from the axis of symmetry 45, the higher the level of strain that would be experienced by sensor elements 43 positioned along such plane. For example, each sensor elements 43 in the same plane on the tension side but at different distances from the fixed end of the cantilevered beam would experience either a generally linear (as shown) or non-linear increase in strain defining the special correlative relationship. That is, the special correlative relationship can be the functional behavior of the strain distribution curve, e.g., increase of the linearity. Knowing the strain distribution for the known impulse, either the central computer 39, data collector or collectors 37, and one or more of the health monitoring sensor nodes 35 can analyze the strain distribution and at least determine the special correlative relationship between adjacent sensor nodes 35 (sensor elements 43). Additionally, according to some configurations, the system 30 can determine the actual physical position of the sensor elements 43.

The parameter processing program product 61 can also include instructions to perform the operation of detecting or otherwise determining a change in the special correlating relationship, such as, for example, a change in stress or stress distribution among nodes 35, spatially and/or temporally, indicating onset of an incipient failure of the structure and/or actual damage, e.g., crack in or delamination of the structure 31. This can be accomplished by comparing the detected strain distribution with that determined with respect to a known impulse, as described above. For example, if multiple sensor elements 43 spaced at different distances experience a linear increase in strain as a function of distance, i.e., a straight line can be drawn between them, a discontinuity in that line, e.g., an anomaly at one of the sensor elements 43, would be indicative of failure. Thus, if the system 30 includes a collection of sensor nodes 35 having sensor elements 43 positioned along the line of the body 33 of the structure 31, a change or disturbance in the strain distribution along the cantilevered beam would be indicative of either damage or incipient failure. Correspondingly, a progressive change or a sudden disturbance in the strain distribution as a function of time would be indicative of incipient failure and sudden damage, respectively. Beneficially, analyzing deviations in the trend, itself, spatially and/or temporally, provide an indication of a failure without need to know numerically the actual values describing the trend.

In response to detection of the change in stress distribution, the system 30 can infer a state of health of the structure 31. The system 30, through the parameter processing program product 61, can detect or otherwise determine a type of damage or incipient failure from the spatial and/or temporal anomaly or deviation in the strain distribution, a severity of the damage or incipient failure from the magnitude of the anomaly and/or number of sensor elements 43 or area of the structure 31 experiencing the anomaly or deviation in the strain distribution, and/or location of damage to the structure 31 or incipient failure thereof determined from the analysis performed during implementation of the known impulse, described above, and from analyzing which sensor elements 43 are experiencing the anomaly or deviation in the strain distribution.

When the structure 31, for example, is an aircraft wing, such damage that can be detected can include that from a birdstrike, battle damage, and other forms of impact damage or catastrophic structural failure known to those skilled in the art. The incipient failure can include delamination, crack formation, or other progressive failures known to those skilled in the art. FIGS. 10-17 are shown to provide an indication of unique properties indicative of the various types of failures. For example, FIGS. 10-13 illustrate a strain distribution detected using embedded sensors 43 in a bending condition (see FIGS. 10-11) and in a tension condition (see FIGS. 12-13). FIGS. 14-17 illustrate a strain distribution detected using non-embedded sensors 43 in a bending condition (see FIGS. 14-15) and in a tension condition (see FIGS. 16-17). By analyzing the distribution for the parameter of interest, e.g., strain distribution, the category of the special correlative relationship can be determined which can then provide the type, location, and/or severity of damage or incipient failure of the structure 31. Note, the system 30 would require more complex sensing techniques to accomplish such functions if the data from each sensor element 43 were to be viewed independently.

Figure 11:
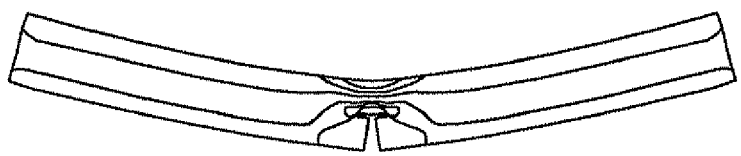
FIG. 11 is a graphical display of the strain distribution on the structure shown in FIG. 10 according to an embodiment of the present invention.
Figure 12:
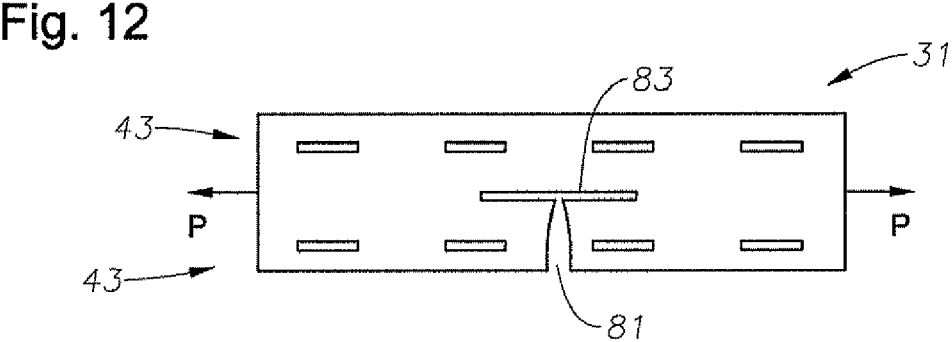
FIG. 12 is a schematic diagram of a structure to be monitored having spatially correlated embedded sensor elements subjected to a tension force and experiencing both a crack and delamination according to an embodiment of the present invention.
Figure 13:
FIG. 13 is a graphical display of the strain distribution on the structure shown in FIG. 12 according to an embodiment of the present invention.
Figure 14:
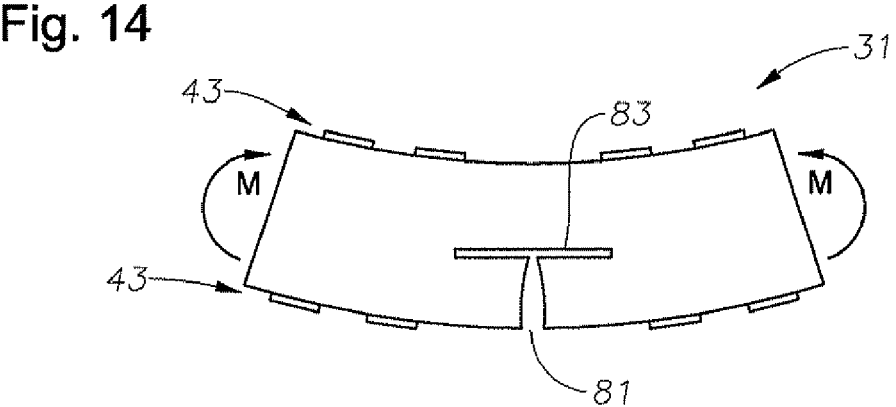
FIG. 14 is a schematic diagram of a structure to be monitored having spatially correlated surface mounted sensor elements subjected to a bending force and experiencing both a crack and delamination according to an embodiment of the present invention.
Figure 15:
FIG. 15 is a graphical display of the strain distribution on the structure shown in FIG. 14 according to an embodiment of the present invention.
Figure 16:
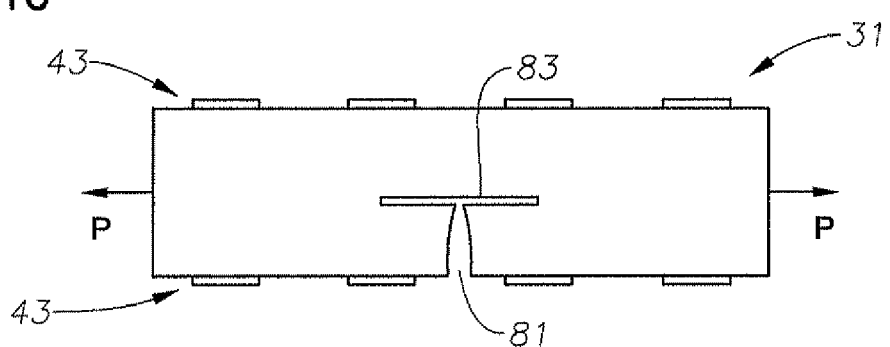
FIG. 16 is a schematic diagram of a structure to be monitored having spatially correlated surface mounted sensor elements subjected to a tension force and experiencing both a crack and delamination according to an embodiment of the present invention.
Figure 17:
FIG. 17 is a graphical display of the strain distribution on the structure shown in FIG. 16 according to an embodiment of the present invention.

As shown in FIGS. 10-11, and 14-15, a crack 81, delamination 83, or a combination thereof developing in a cantilevered structure, e.g., aircraft wing, due to a bending force M will result in identifiable stress signatures. That is, as shown in FIGS. 11 and 15, as the carbon fibers, for example, began to break on the bottom of the structure 31 and delaminate, a deviant compressive strain at the top and a deviant tensile strain at the bottom will develop. According to an embodiment of the present invention, this signature cannot be obtained by just by viewing the output of sensor elements 43 on either the top or the bottom. Beneficially, by determining the strain on both the top and bottom of the structure 31, the strain distribution may show anomalies indicating onset of an incipient failure, e.g., a developing or growing crack or a delamination, prior to such failure. A similar result is achieved through detecting other unique signatures associated with incipient failure, e.g., a developing crack or delamination, resulting from a tension force P as illustrated in FIGS. 12-13 and 16-17. For example, as illustrated, if the top and the bottom of the structure 31 are under tension force P and a crack begins to develop in the lower portion of the structure 31, the lower portion of the structure 31 will experience an area of higher stress due to the developing crack and an area of reduced less stress adjacent the crack 81.

The parameter processing program product 61 can also include instructions to perform the operation of triggering an alarm in response to the change in stress distribution. The system 30 can provide enhanced damage or failure notification over that available merely by providing an alert based on individual nodes experiencing a threshold level of the parameter of interest, e.g., strain. For example, a delamination can result in a stress that in and of itself may not be high enough to trigger any threshold alarm in the system 30. By determining the stress experienced by a first sensor element 43 of a sensor node 35 as compared to that of a neighboring sensor element 43/sensor node 35, a jump in the stress distribution experienced by the sensor elements 43 can be detected which can allow for triggering an alarm at a much lower threshold value.

The parameter processing program product 61 can also include instructions to perform the operation of determining operational parameter limitations of the structure 31 in response to detection of damage to or incipient failure of the structure 31. For example, where the structure 31 is an aircraft wing or other portion of an aircraft, in response to determining the existence of damage or incipient failure, the system 30 can provide the pilot with an optimized flight envelope or profile to impede or reduce the risk of catastrophic failure. That is, during operational employment of the aircraft, in response to detection of the damage or incipient failure, the system 30 can provide the pilot a reduced maximum airspeed and reduced acceleration limitations, recommend optimum or safe flight profiles, and/or lock-out unsafe flight maneuvers.

As described previously, according to embodiments of the present invention, the special correlative relationship between sensor elements 43 and/or sensor nodes 35 is a function of time, and thus, can include a temporal component, i.e., a time correlation of the special correlative relationship. In addition, the set of nodes 35 that are in correlative relationship can change as a function of time. Moreover different relationships can use a different sub-set of nodes 35. The time correlation of the special correlation can provide a time trending aspect to the analysis of the parameters of interest, e.g., strain, and the resulting strain distribution. That is, strain can be recorded or otherwise detected by the sensor nodes 35 in a time-synchronized fashion so that system 30 can compare the correlative relationship of all the sensor nodes 35 or preselected groups thereof, and an analysis of how that relationship changes over time can be perform to determine or detect disturbances as they deviated from that expected over time. Even if the system 30 cannot or is not set to determine the actual strain distribution, by resolving the correlatable relationship over time, the system 30 can nevertheless detect indications of structural failure.

According to an embodiment of the present invention, an active synchronization process can be performed wirelessly with all sensor nodes 35 or individual groups of sensor nodes 35 taking periodic readings at the same time. The central computer 39, data collectors 37, and/or sensor nodes 35 can be configured so that each sensor node 35 or group of associated sensor nodes 35 are synchronized, e.g., phase locked, with each other. According to an embodiment of the present invention, a special message, e.g., time synchronization message data packet numbered in sequence, is periodic transmitted to the associated sensor nodes 35 or groups of sensor nodes 35. For example, every 256 message clock cycles (messages), the time synchronization message data packet can be provided to each sensor node 35 or to a selected group of sensor nodes 35. Due to the synchronization process, the time synchronization between sensor nodes 35 does not begin wondering with respect to each other sensor node 35. Further, beneficially, employing such synchronization process negates the need to rely on internal clocks, e.g., real-time clocks or other means for providing actual date and/or time, which may start drifting.

Figure 18:
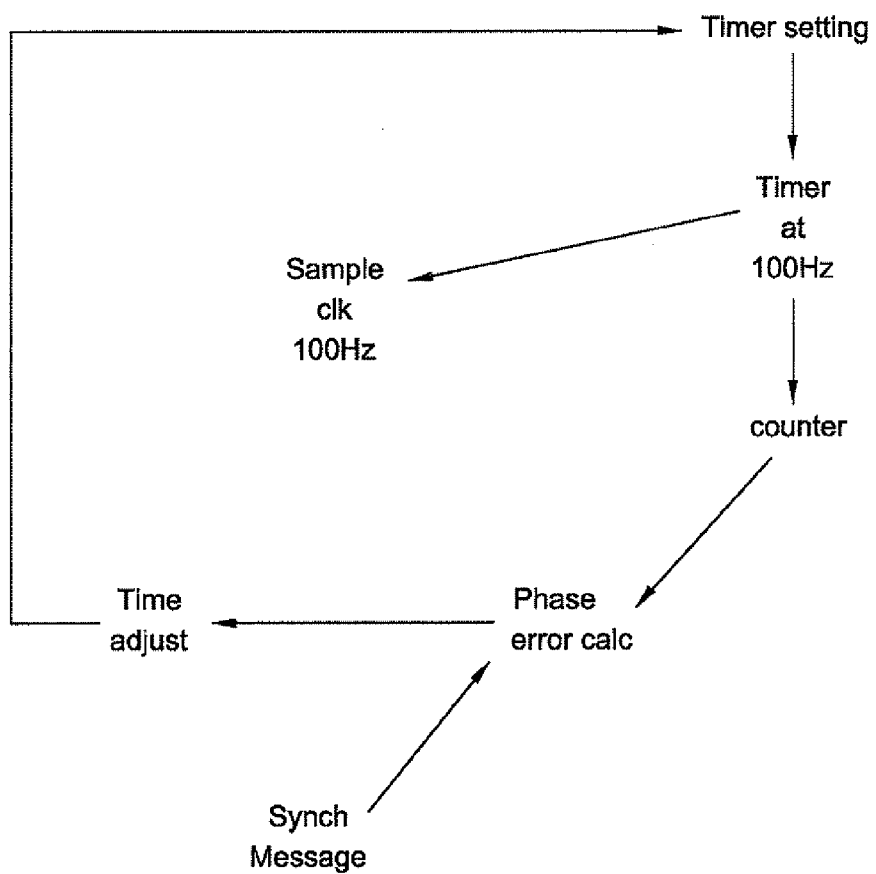
FIG. 18 is a schematic flow diagram of a portion of a time synchronization process according to an embodiment of the present invention.

FIG. 18 illustrates an example synchronization process whereby every 100 clock cycles (one second), a synchronization message is provided to a sensor node 35 which performs a phase error calculation and adjusts its derived software clock to be faster or slower to maintain a phase lock between sensor nodes 35. According to a preferred configuration, the data packet includes a sample or message sequence number so that when a sensor node 35 provides the collected data, the system 30 can deduce that every other sensor node 35 in the system or group of sensor nodes 35 having the same message sequence number collected data at the same time. According to an embodiment of the present invention, this time synchronization process can be initiated either on startup of the central computer 39 or a pre-specified event such as, for example, detection of aircraft movement, etc.

Due to the wireless environment, the time synchronization messages may or may not arrive. For example, message arrival sequence may be message number 1, 2, 3, skip 4, 5, 6, etc. In the simplest configuration, the time synchronization message count can roll over every 256 message clock cycles, thus, only one byte of the data packet is required to provide the message count. In such configuration, the time synchronization process assumes that a functioning sensor node 35 will not miss all 256 time synchronization messages. Beneficially, according to such configuration, the sensor nodes 35 need not know relative time, but merely can perform parameter reads in relative sequence and associate such data with a corresponding data packet including the same sequence number which can be assumed to have been taken approximately at the same time. That is, the central computer 39, for example, can associate all message packets having a message sequence number of, e.g., 00010001, with all others having to same message sequence number to thereby provide the temporal correlation of the special correlative relationship. Note, according to an alternative configuration, the sensor nodes 35 can be configured to provide absolute time rather than relative time.

It is important to note that while embodiments of the present invention have been described in the context of a fully functional system, those skilled in the art will appreciate that the mechanism of the present invention and/or aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links. For example, such media can include both operating instructions and instructions related to the parameter processing program product 61 described above and much of the method steps described below.

Figure 19:
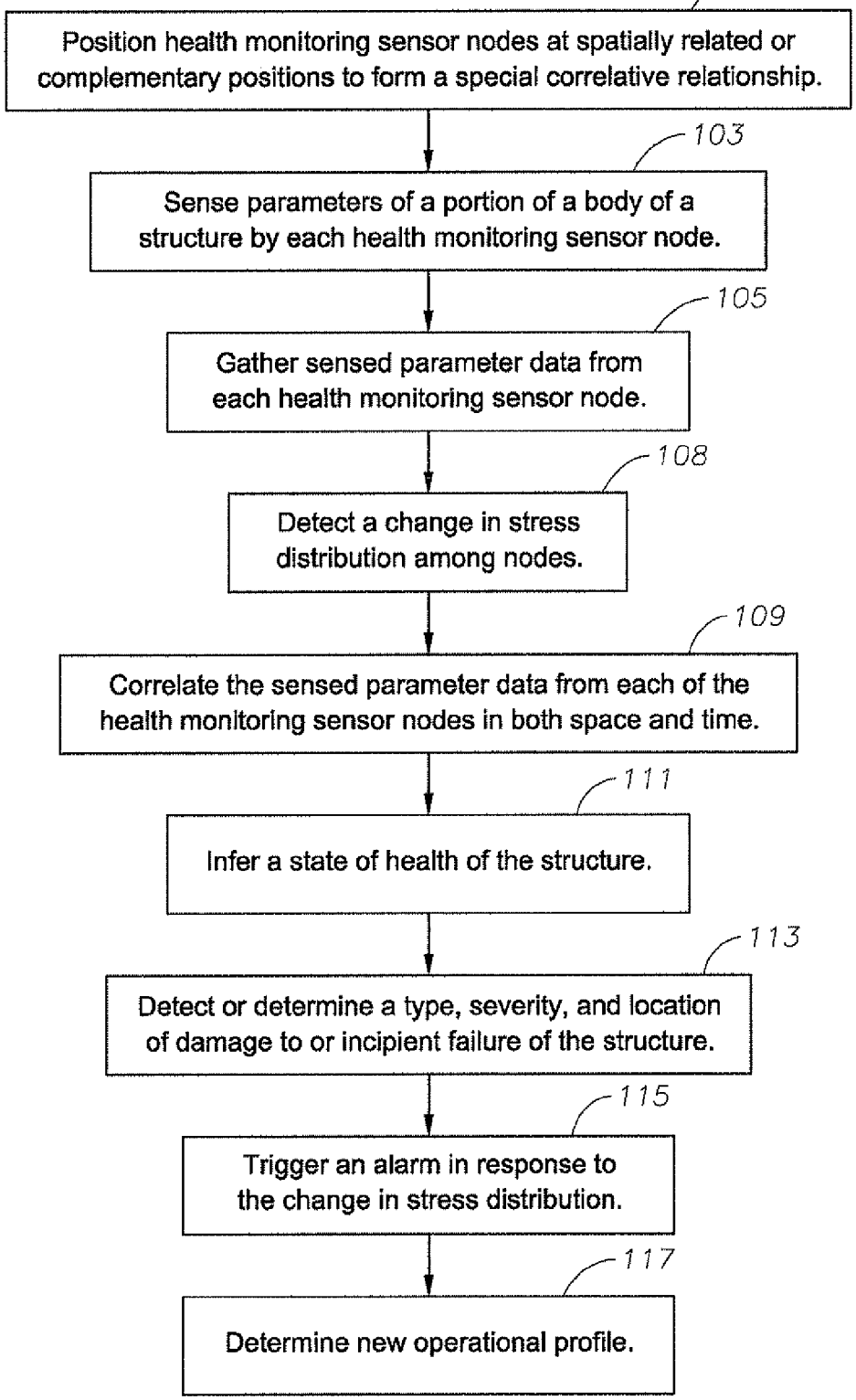
FIG. 19 is a schematic flow diagram of a method to monitor the health of a structure according to embodiment of the present invention.
Figure 20:
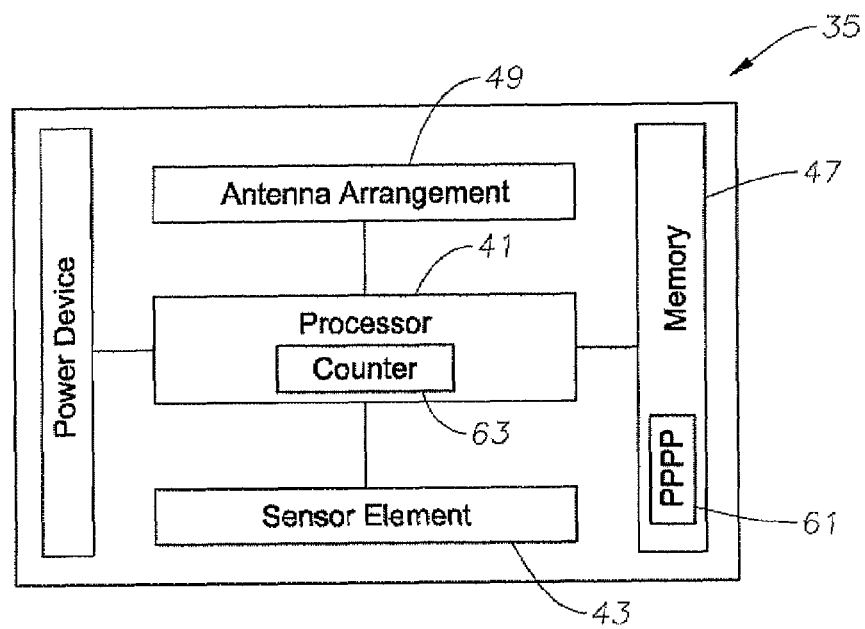
FIG. 20 is a schematic diagram of a health monitoring sensor node configured to have an internal sensor element according to an embodiment of the present invention.
Figure 21:
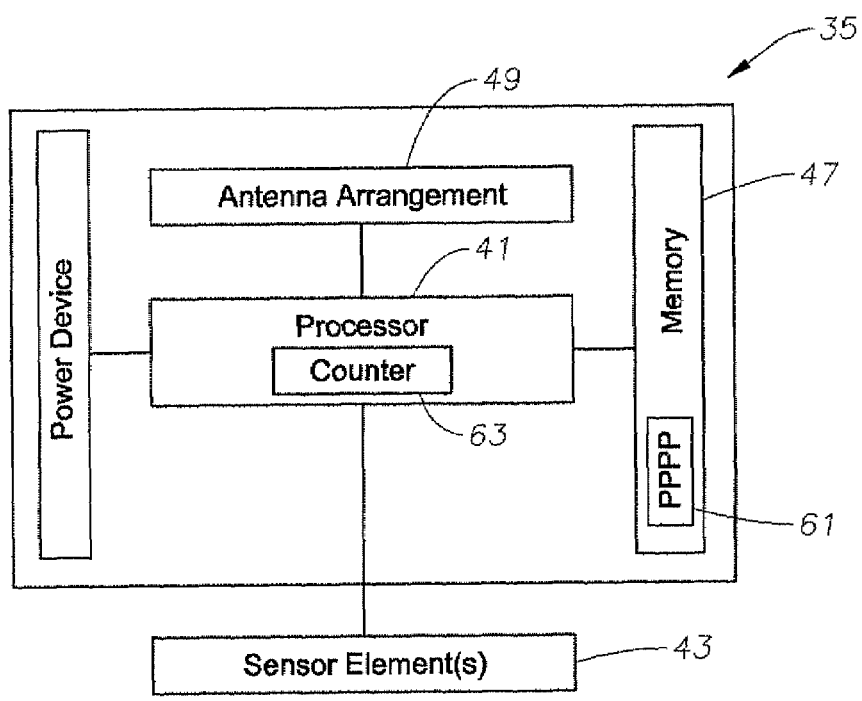
FIG. 21 is a schematic diagram of a health monitoring sensor node configured to have an external sensor element according to an embodiment of the present invention.

Embodiments of the present invention include methods to monitor the structural health of a structure 31. As shown in FIG. 19, according to an embodiment of the present invention, a method can include the steps of positioning a plurality of health monitoring sensor nodes 35 including sensor elements 43 at spatially related or complementary positions on or within a body 33 of a structure 31 to form a special correlative relationship (block 101), and periodically sensing parameters of a portion of the body 33 of the structure 31 by each of the health monitoring sensor nodes 35 through the sensor elements 43 (block 103) either automatically in response to an internal count or in response to a request data message. The method can include gathering sensed parameter data from each health monitoring sensor node 35 or selected subsets or groups thereof (block 105), and detecting or otherwise determining a change in stress distribution among nodes describing onset of an incipient failure of the structure 31 and/or detecting a variation in stress between at least a pair of sensor nodes 35 (sensor elements 43) describing damage to the structure 31 (block 107).

The method further can include the steps of correlating the sensed parameter data from the sensor nodes 35 in space and/or time (block 109) to infer a state of health of the structure 31 (block 111) to thereby detect a type, severity, and/or location of damage to the structure 31 or to detect incipient failure thereof (block 113). The method can also include the steps of triggering an alarm responsive to the change in stress distribution (block 115), and where the structure 31 is an aircraft structural component, determining an optimized flight envelope during flight in response to in-flight detection of damage to or incipient failure of the structure 31 (block 117).

Still further, the method can include the steps of employing a network time synchronization process to correct a time sampling phase error in each of the plurality of health monitoring sensor nodes 35. The time synchronization process can include providing a periodic time synchronization message to each of the health monitoring sensor nodes 35 and updating a derived software clock within each sensor node 35 in response to the time synchronization message to phase-lock the sensor nodes 35. As described previously, such process negates the need for a real-time clock and allows for temporally correlating data based on the process which includes providing sensed or process data along with a message sequence number.

The invention has several advantages. Embodiments of the present invention provide a multi-sensor structural health monitoring system that can address problems of multi-sensor distributed monitoring or control systems in which multiple nodes have sensors, and can address issues dealing w/insitu identification of failures in composite materials. Advantageously, the data from the sensors can be correlated in time as well as in space. This data synchronization can allow for a more complete view of the health of the structure. Embodiments of the present invention also enable a monitoring or control system to view the data from the various nodes in a time and space correlated manner in order to perform functions that otherwise would be difficult if not impossible to perform, or would require more complex sensing techniques to accomplish if the data from each sensor/node were to be viewed independently.

Embodiments of the present invention provide a system for correlating the data which can allow for detecting various types of failures in composite materials, for example, in-plane de-lamination or transverse cracking, which form part of a larger multi-node health monitoring system such as, for example, the system described in U.S. patent application Ser. No. 11/286,792 by Andarawis, et al. titled "System to Monitor the Health of a Structure, Sensor Nodes, Program Product," incorporated herein by reference in its entirety. Sensor nodes can be spatially placed at related or complementary positions and time synchronization can be used to further deduce damage data. Advantageously, embodiments of the present invention can include an array of sensor nodes that collect data in a spatially correlated manner which can be used to map the stress/strain field of a composite panel or structure that is not otherwise easily obtained. Through comparisons at various locations, identification of failures and impeding conditions are possible. Advantageously, embodiments of the system can eliminate the need for clock distribution networks that may require inter-node wiring, or complex, power intensive communication schemes.

Embodiments of the present invention can provide a completely passive monitoring system. According to an embodiment no external actuation is required besides the structure's natural vibration or energy. Embodiments of the present invention also provide an ability to detect damage and identify a failure location without removing panels. Further, advantageously, detection of failure is possible in a field or operational/environment.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification. For example, much of the focus of the illustrated embodiments was on detecting strain distribution, other parameters of interest such as, for example, temperature and pressure or others known to those skilled in the art are within the scope of the present invention.

That claimed is:

1. A structural health monitoring system, comprising:
    a structure to be monitored having a body including an axis of symmetry; and
    a plurality of spatially paired health monitoring sensor nodes, each health monitoring sensor node positioned separate and spaced apart from each other of the health monitoring sensor nodes, each node connected to or embedded within the body of the structure to monitor data related to parameters of a portion of the body of the structure, each node including a sensor element to sense parameters of a respective portion of the body of the structure to define sensed parameters, each node of the plurality of spatially paired health monitoring sensor node pairs located on an opposite side of the axis of symmetry to establish a special correlative relationship therebetween, each of the plurality of spatially paired health monitoring sensor node pairs having a separate communication link to share information to correlate the monitored data therebetween, and only one of the nodes of each node pair transmitting the correlated data to a central computer or data collector.

2. The system as defined in claim 1, wherein the data collector is the one of the health monitoring sensor nodes of the plurality of spatially paired health monitoring sensor nodes.

3. A multi-node sensor system to monitor the structural health of a structure, the system comprising:
    a structure to be monitored having a body;
    a plurality of separate and spaced apart health monitoring sensor nodes each connected to or embedded within the body of the structure to monitor data related to parameters of a portion of the body of the structure, each node including a sensor element to sense parameters of a respective portion of the body of the structure to define sensed parameters, a processor coupled to the sensor element to receive sensed parameters, and memory coupled to the processor to store data and operating instructions therein, the sensor element of at least one of the plurality of health monitoring sensor nodes spatially positioned along the body of structure at a related or a complementary location to the sensor element of at least one other of the plurality of health monitoring sensor nodes to form a special correlative relationship therebetween;
    a data collector having a transceiver positioned to gather sensed parameter data from each of the plurality of health monitoring sensor nodes;
    a central computer in communication with the data collector and having a processor and memory coupled to the processor to store requested data and operating instructions therein; and
    parameter processing program product stored in the memory of central computer and including the operating instructions that when executed by the central computer processor perform the operations of:
        analyzing the sensed parameter data from each of the plurality of health monitoring sensor nodes,
        spatially correlating the sensed parameter data from each of the plurality of health monitoring sensor nodes, and
        inferring a state of health of the structure responsive to the correlation to provide damage and incipient failure detection.

4. The system as defined in claim 3,
    wherein the body of the structure includes an axis of symmetry;
    wherein the plurality of health monitoring sensor nodes includes a plurality of spatially paired health monitoring sensor nodes; and wherein each node of the plurality of health monitoring sensor node pairs is located on opposite sides of the axis of symmetry to establish the special correlative relationship.

5. A multi-node sensor system to monitor the structural health of a structure, the system comprising:

a structure to be monitored having a body;

a plurality of separate and spaced apart health monitoring sensor nodes each connected to or embedded within the body of the structure to monitor data related to parameters of a portion of the body of the structure, each node including a sensor element to sense parameters of a respective portion of the body of the structure to define sensed parameters, a processor coupled to the sensor element to receive sensed parameters, and memory coupled to the processor to store data and operating instructions therein, the sensor element of at least one of the plurality of health monitoring sensor nodes spatially positioned along the body of structure at a related or a complementary location to the sensor element of at least one other of the plurality of health monitoring sensor nodes to form a special correlative relationship therebetween;

a data collector having a transceiver positioned to gather sensed parameter data from each of the plurality of health monitoring sensor nodes and to transmit a periodic time synchronization message to each of the plurality of health monitoring sensor nodes;

a central computer in communication with the data collector and having a processor and memory coupled to the processor to store requested data and operating instructions therein; and parameter processing program product stored in the memory of central computer and including instructions that when executed by the central computer processor performs the operations of:

collectively analyzing the sensed parameter data from each of the plurality of health monitoring sensor nodes, correlating the sensed parameter data from each of the plurality of health monitoring sensor nodes in both space and time, inferring a state of health of the structure responsive to the correlation, and determining at least one of the following: a type, severity, and location of damage to the structure or incipient failure thereof responsive to the inference.

6. The system as defined in claim 5, wherein the parameter processing program product further includes instructions to perform the operation of employing a network time synchronization process to correct a time sampling phase error in each of the plurality of health monitoring sensor nodes including providing the periodic time synchronization message to each of the plurality of health monitoring sensor nodes.

7. A multi-node sensor system to monitor the structural health of a structure, the system comprising:

a structure to be monitored having a body;

a plurality of separate and spaced apart health monitoring sensor nodes each connected to or embedded within the body of the structure to monitor data related to parameters of a portion of the body of the structure, each node including a sensor element to sense parameters of a respective portion of the body of the structure to define sensed parameters, a processor coupled to the sensor element to receive sensed parameters, and memory coupled to the processor to store data and operating instructions therein, the sensor element of at least one of the plurality of health monitoring sensor nodes spatially positioned along the body of structure at a related or a complementary location to the sensor element of at least one other of the plurality of health monitoring sensor nodes to form a special correlative relationship therebetween;

a data collector having a transceiver positioned to gather sensed parameter data from each of the plurality of health monitoring sensor nodes and to transmit a periodic time synchronization message to each of the plurality of health monitoring sensor nodes;

a central computer in communication with the data collector and having a processor and memory coupled to the processor to store requested data and operating instructions therein; and parameter processing program product stored in the memory of one of the plurality of health monitoring sensor nodes and including instructions that when executed by the respective sensor node processor perform the operations of:

gathering sensed parameters from at least one other of the plurality of health monitoring sensor nodes, collectively analyzing the sensed parameters from the one of the plurality of health monitoring sensor nodes and the at least one other of the plurality of health monitoring sensor nodes, correlating the sensed parameter data in both space and time, inferring a state of health of the structure responsive to the correlation, and detecting at least one of the following: a type, severity, and location of damage to the structure or incipient failure thereof responsive to the inference.

8. A multi-node sensor system to monitor the structural health of a structure, the system comprising:

a structure to be monitored having a body;

a plurality of separate and spaced apart health monitoring sensor nodes each connected to or embedded within the body of the structure to monitor data related to parameters of a portion of the body of the structure, each node including a sensor element to sense parameters of a respective portion of the body of the structure to define sensed parameters, the sensed parameters include stress, each node further including a processor coupled to the sensor element to receive sensed parameters, and memory coupled to the processor to store data and operating instructions therein, the sensor element of at least one of the plurality of health monitoring sensor nodes spatially positioned along the body of structure at a related or a complementary location to the sensor element of at least one other of the plurality of health monitoring sensor nodes to form a special correlative relationship therebetween;

a data collector having a transceiver positioned to gather sensed parameter data from each of the plurality of health monitoring sensor nodes and to transmit a periodic time synchronization message to each of the plurality of health monitoring sensor nodes;

a central computer in communication with the data collector and having a processor and memory coupled to the processor to store requested data and operating instructions therein; and parameter processing program product stored in the memory of at least one of the central computer or one of plurality of health monitoring sensor nodes and including instructions that when executed by the respective central computer or sensor node processor perform the operations of:

collectively analyzing the sensed parameter data from each of the plurality of health monitoring sensor nodes, correlating the sensed parameter data from each of the plurality of health monitoring sensor nodes to detect a change in stress distribution among nodes describing onset of an incipient failure of the structure, and inferring a state of health of the structure responsive to detection of the change in stress distribution.

9. The system as defined in claim 8, wherein the structure is an aircraft, and wherein the parameter processing program product further includes instructions to perform the operation of determining an optimized flight envelope responsive to detection of damage to or incipient failure of the structure.

10. A method to monitor the structural health of a structure, the method comprising:

positioning a plurality of health monitoring sensor nodes each having at least one parameter sensor element at spatially related or complementary positions along a body of a structure to form a special correlative relationship therebetween:

sensing parameters of a portion of the body of the structure by each of the plurality of health monitoring sensor nodes;

employing data synchronization between each of the plurality of health monitoring sensor nodes to provide an enhanced view of the health of the structure, the data synchronization including performing synchronized data acquisition by each one of the plurality of health monitoring sensor nodes with at least one other of the plurality of health monitoring sensor nodes;

gathering sensed parameter data from each of the plurality of health monitoring sensor nodes;

spatially correlating the sensed parameter data from each of the plurality of health monitoring sensor nodes;

temporally correlating the sensed parameter data from each of the plurality of health monitoring sensor nodes;

inferring a state of health of the structure responsive to both the spatial correlation and the temporal correlation; and detecting at least one of the following: a type, severity, and location of damage to the structure, or an incipient failure thereof, responsive to the inferred state.

11. A method as defined in claim 10, further comprising the step of employing a network time synchronization process to correct a time sampling phase error in each of the plurality of health monitoring sensor nodes, the time synchronization process including providing a periodic time synchronization message to each of the plurality of health monitoring sensor nodes.

12. A method as defined in claim 10, wherein the sensed parameters include stress, and wherein the method further comprises the steps of:

detecting a change in stress distribution among nodes describing onset of an incipient failure of the structure; and triggering an alarm responsive to the change in stress distribution.

13. A method as defined in claim 10, wherein the sensed parameters include stress, and wherein the method further comprises the steps of:

detecting a variation in stress between a pair of nodes describing damage to the structure; and triggering an alarm responsive to the variation in stress distribution.

14. A method as defined in claim 10, wherein the structure is an aircraft, and wherein the method further comprises the step of determining an optimized flight envelope during flight responsive to in-flight detection of damage to or incipient failure of the structure.

* * * * *

UNITED STATES PATENT AND TRADEMARK OFFICE
CERTIFICATE OF CORRECTION

PATENT NO.        : 7,571,058 B2
APPLICATION NO.   : 11/430410
DATED             : August 4, 2009
INVENTOR(S)       : Sealing et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 21 days.

Signed and Sealed this

Seventh Day of September, 2010

David J. Kappos
*Director of the United States Patent and Trademark Office*